(No Model.)  J. B. G. DONATO.  2 Sheets—Sheet 1.
GAME TRAP.

No. 560,846.  Patented May 26, 1896.

Witnesses
D. H. Blakelock
John C. Wilson

Inventor
John B. G. Donato
by Whitman + Wilkinson
Attorneys (No Model.) 2 Sheets—Sheet 2.

J. B. G. DONATO.
GAME TRAP.

No. 560,846. Patented May 26, 1896.

Witnesses
D. H. Blakelock.
John C. Wilson.

Inventor
John B. G. Donato,
by Whitman & Wilkinson
Attorneys.

UNITED STATES PATENT OFFICE.

JOHN B. G. DONATO, OF OPELOUSAS, LOUISIANA, ASSIGNOR OF ONE-THIRD TO T. S. FONTENOT, OF SAME PLACE.

GAME-TRAP.

SPECIFICATION forming part of Letters Patent No. 560,846, dated May 26, 1896.

Application filed September 20, 1895. Serial No. 563,093. (No model.)

*To all whom it may concern:*

Be it known that I, JOHN B. G. DONATO, a citizen of the United States, residing at Opelousas, in the parish of St. Landry and State of Louisiana, have invented certain new and useful Improvements in Game-Traps; and I do hereby declare the following to be a full, clear, and exact description of the invention, such as will enable others skilled in the art to which it appertains to make and use the same.

My invention relates to improvements in traps for fish, ducks, geese, and all species of small land animals, birds, and the like; and it consists of certain novel features hereinafter described and claimed.

Reference is had to the accompanying drawings, in which the same parts are indicated by the same letters throughout the several views.

Figure 1:
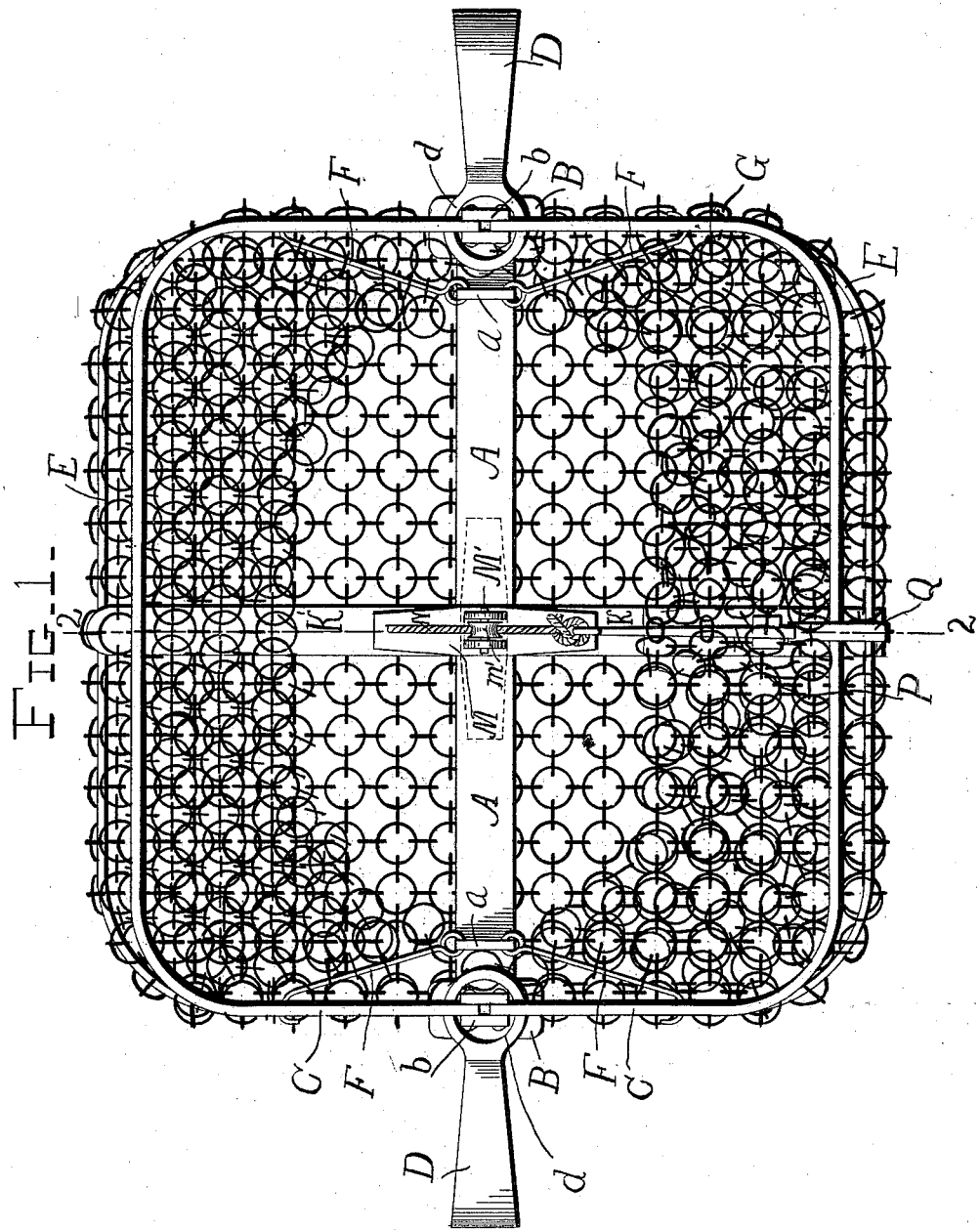
Figure 2:
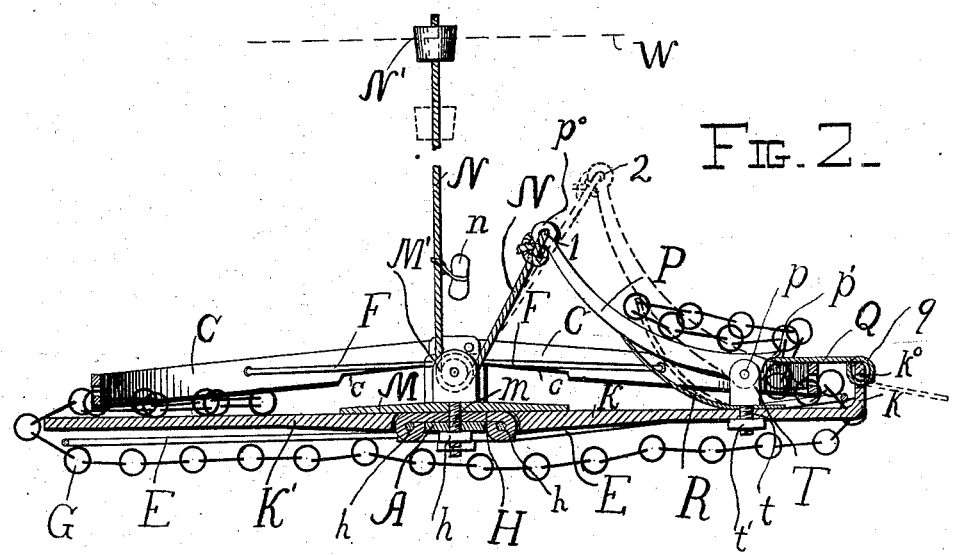

Figure 1 represents a plan view of the trap as set, the bait being omitted. Fig. 2 represents a section along the line 2 2 of Fig. 1; and Fig. 3 represents a similar section to that shown in Fig. 2, except the trap is shown in the closed position.

A represents a bar or plate extending longitudinally across the bottom of the trap and terminating in the plates B, to which the lugs $b$ are secured, in which lugs the bows C of the trap are hinged, as shown most clearly in Figs. 1 and 2.

Figure 3:
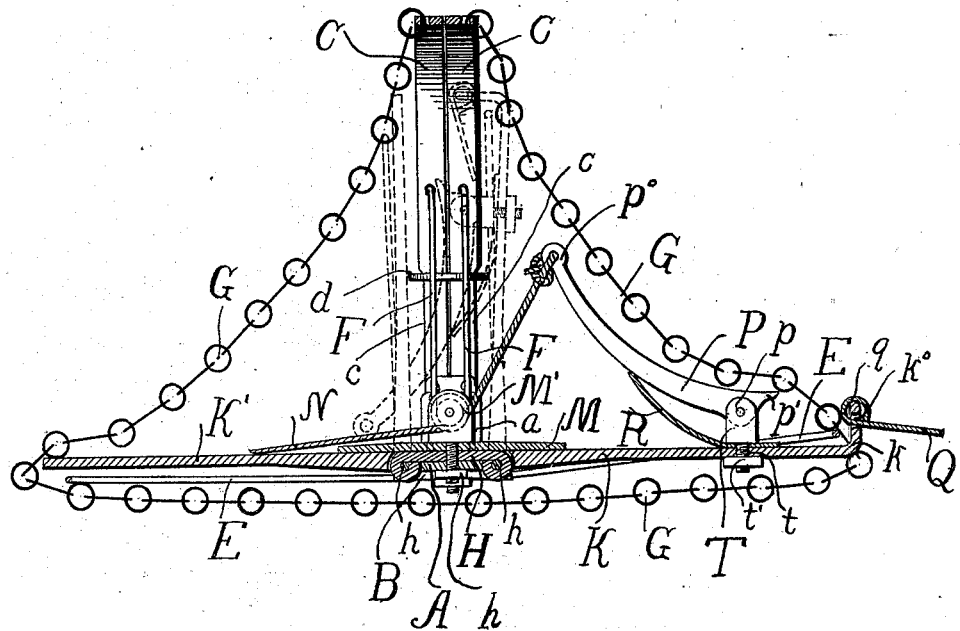

The closing-springs D have their lower ends secured in any convenient way to the plate B and terminate at their upper ends in an eye $d$ of sufficient diameter to slip up on the cutaway portion $c$ of the bows C, as shown in Fig. 3.

E represents one of two wire bows or loops which serve to distend the bottom of the trap, and over which the netting G, which is preferably made of metal loops or other suitable flexible material made of metal, is secured. These wire loops E are hinged to the bottom of the trap, so as to render it more convenient to stow and to transport the trap. The netting for capturing birds and fish may be made of twine or cord; but where the trap is to be used for the capture of rodents or land animals generally a metallic net should be used. In order to allow the eyes $d$ to slide freely on the reduced portion $c$ of the bows C, the net is not secured to this portion of the said bows, but is fastened to rods F, pivotally connected to suitable lugs $a$ on the bar A, as shown most clearly in Fig. 1.

The bar A is provided near its center with a plate H, bent over, as at $h$, on either side of the said bar and secured thereto by the bolt $h'$, which bolt is held in place by a nut, while its opposite end serves as a pivot for the plate M, which when swung transverse to the bar A holds extended the two laterally-projecting arms K and K' and thus keeps the bottom of the trap spread out. When this plate M is swung around to the position shown in dotted lines in Fig. 1, these pivoted arms K and K' may be swung upward to the position shown in dotted lines in Fig. 3, and thus the trap may be conveniently stowed for purposes of transportation. This plate M carries lugs M', in which is journaled a pulley $m'$, under which passes the cord N, to one end of which the bait is attached. The other end of this cord is attached to the eyes $p^0$ in the trigger-lever P. This lever is pivoted at $p$ between the lugs $t$, which form the head of the bolt T. The lower end of said bolt presses on the spring R and is clamped in place by the nut $t'$.

The outer end of the trigger-lever is curved, as at $p'$, and engages the free end of the catch Q, which is pivoted, as at $q$, to an eye $k^0$ in the bent-up end $k$ of the arm K. The tension of the spring R should be just sufficient to press up the opposite end of the trigger and to hold this catch Q in the locked or "set" position against the springs D when the trap is set, as shown in Fig. 2. Then a slight pull on the cord N will release this catch Q, and the springs D will swing the bows C together rapidly, trapping any animal that may remain between them.

The trap being in the position shown in dotted lines in Fig. 3, in order to set the same swing down the arms K and K' and swing around the plate M, locking the said arms in the extended position, as shown in Fig. 3. Then press down the bows C and at the same time the eyes $d$ of the springs D, and arrange the trigger P and catch Q as shown in Fig. 2.

The bait may be attached to the cord N at any time during the operation and in any convenient way.

Traps of this description may be of any size desired, and can be readily hidden in dead leaves, or partly sunk in the mud on mud flats, or allowed to rest on the bottom of streams where the land animal, the ducks or geese, or the fish, respectively, are most likely to take the bait.

Where it is desired to set the trap under water, as for fish, wild ducks, or the like, the bait is secured to the cord N, as at n, and a float N' is attached to the cord so as to just appear above the level of the water W, all as shown in Fig. 2. Then when the trap is sprung the trigger P flies from the position indicated by dotted lines in Fig. 2 and the float is pulled down through the distance represented by the dotted line 1 2, causing the said float to disappear and informing the trapper that the trap is closed.

The various advantages of the herein-described construction and of the operation of the herein-described device will readily suggest themselves to any one who has had experience in trapping.

It will be obvious that various modifications might be made which could be used without departing from the spirit of my invention.

Having thus described my invention, what I claim, and desire to secure by Letters Patent of the United States, is—

1. A spring-trap of the character described, comprising a bar A with bows C pivoted to either end thereof, with netting secured to said bows, transverse arms K and K' hinged near the center of said bar, a pivoted plate M tending to hold said bar and normally tending to close said bows, and a tripping attachment carried by one of said arms with means operated by the animal for tripping the same, whereby said bows may be held and released when desired, substantially as described.

2. In a spring-trap of the character described, the combination with the bar A, and the bows pivotally connected to the same, of the D-springs also connected to said bar and adapted to close said bows, the extensible arms K and K' pivoted to said bar, the pivoted plate M mounted on said bar and adapted to hold said arms extended, the loops E also pivoted to said bar, the netting G secured to said bows and passing over said loops, and a tripping attachment connected to one of said arms and adapted to hold the said bows in the open position, with means operated by the animal for tripping the same, substantially as described.

3. In a spring-trap of the character described the combination with an extensible frame and bows pivoted thereto, with netting secured to said bows and covering said frame, of D-springs attached to said frame, and adapted to swing said bows into the closed position, a catch and trigger-lever for holding said bows in the open position, a spring bearing on the inner end of said trigger-lever, a pulley mounted in said frame, and a cord secured to the inner end of said trigger-lever and passing under said pulley, substantially as described.

In testimony whereof I affix my signature in presence of two witnesses.

JOHN B. G. DONATO.

Witnesses:
C. MANHIMIG,
CORNELIUS DONATO.